Figure 1:
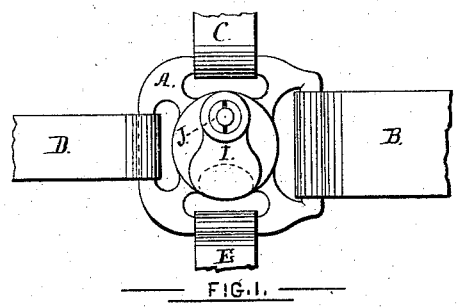

H. E. CHADWICK.
DEVICES FOR ATTACHING HORSES TO VEHICLES.

No. 189,842.  Patented April 24, 1877.

WITNESSES.  
Albert Aldrich.  
Henry C. Knight.

INVENTOR.  
H. E. Chadwick.

UNITED STATES PATENT OFFICE.

HORACE E. CHADWICK, OF PROVIDENCE, RHODE ISLAND.

IMPROVEMENT IN DEVICES FOR ATTACHING HORSES TO VEHICLES.

Specification forming part of Letters Patent No. 189,842, dated April 24, 1877; application filed March 13, 1877.

*To all whom it may concern:*

Be it known that I, HORACE E. CHADWICK, of Providence, in the State of Rhode Island, have invented a new and useful Device for Hitching Horses to Vehicles; and I do hereby declare that the following specification, taken in connection with the drawing, making a part of the same, is a full, clear, and exact description thereof.

Figure 2:
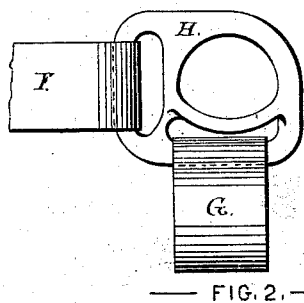
Figure 3:
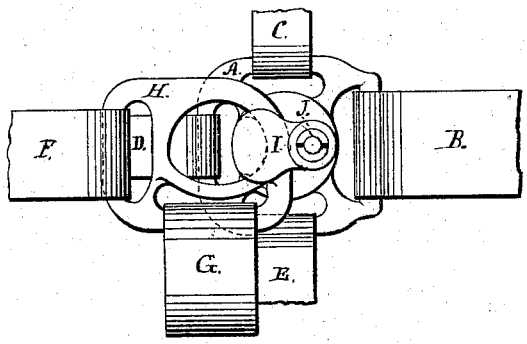

Figure 1 is a front view of the hook. Fig. 2 is a front view of the eye. Fig. 3 shows the entire device.

My invention, although adapted to general use, is more especially designed to be used in connection with fire-engines, hose-carriages, and other like vehicles, where the saving of time in hitching in the horse is an important feature.

In my invention, A, Figs. 1 and 3, represents that part of the device attached to the harness, and which connects the short trace B, the saddle-strap C, the breeching-strap D, and the girth E. The long trace F and the holdback-strap G are kept upon the thill, and are connected together by the remaining part of the device H. The part A is provided with a hook, I, which is attached thereto by a spring swivel-joint, permitting it to move one-quarter round in either direction. The upper end of the hook I has a pin, J, extending inward to a shoulder, and actuated by an interior spring.

The operation of my invention is as follows: At the alarm of fire the horse, which stands harnessed in the stall, is placed between the thills, the eye H upon each side is placed over the corresponding hook I, and the hitching in is complete.

The hook I when relieved from pressure assumes an upright position, as shown in Fig. 1, by reason of the spring and swivel-joint before referred to; but upon the forward or backward movement of the horse a slight pressure turns the hook I one-quarter round in either direction, as the case may be, as shown in Fig. 3, so that the parts will at all times be subjected to a straight pull.

The hooked plate H is prevented from releasing itself from the hook I by the pin J, past which it snaps, the pin J being retained in an extended position by an interior spring.

What I claim as my invention, and desire to secure by Letters Patent, is—

The plate A, having the swivel-spring snap-hook I, arranged to operate in combination with the looped plate H, substantially as and for the purpose specified.

H. E. CHADWICK.

Witnesses:
 ALBERT ALDRICH,
 HENRY C. KNIGHT.